US012400786B2

(12) United States Patent
Arai et al.

(10) Patent No.: US 12,400,786 B2
(45) Date of Patent: Aug. 26, 2025

(54) INDUCTOR

(71) Applicant: Murata Manufacturing Co., Ltd., Kyoto-fu (JP)

(72) Inventors: Takumi Arai, Nagaokakyo (JP); Motoki Toyama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 820 days.

(21) Appl. No.: 17/703,852

(22) Filed: Mar. 24, 2022

(65) Prior Publication Data

US 2022/0310314 A1 Sep. 29, 2022

(30) Foreign Application Priority Data

Mar. 26, 2021 (JP) ................................ 2021-054171
Mar. 26, 2021 (JP) ................................ 2021-054172
Mar. 26, 2021 (JP) ................................ 2021-054174

(51) Int. Cl.
*H01F 27/29* (2006.01)
*H01F 27/25* (2006.01)
*H01F 27/255* (2006.01)
*H01F 27/26* (2006.01)

(52) U.S. Cl.
CPC ......... *H01F 27/292* (2013.01); *H01F 27/255* (2013.01); *H01F 27/266* (2013.01)

(58) Field of Classification Search
CPC ..... H01F 27/292; H01F 27/255; H01F 27/266
See application file for complete search history.

(56) References Cited

U.S. PATENT DOCUMENTS

| | | | | |
|---|---|---|---|---|
| 4,490,706 | A * | 12/1984 | Satou | H01F 5/04 336/96 |
| 2019/0096560 | A1* | 3/2019 | Jang | H01F 17/0013 |
| 2019/0272945 | A1* | 9/2019 | Arai | H01F 27/28 |
| 2020/0265991 | A1* | 8/2020 | Furukawa | H01F 27/324 |
| 2020/0294712 | A1* | 9/2020 | Kim | H01F 27/32 |
| 2021/0020356 | A1* | 1/2021 | Oka | H01F 27/29 |
| 2021/0272745 | A1* | 9/2021 | Wang | H01F 27/245 |
| 2021/0375519 | A1* | 12/2021 | Wang | H01F 17/04 |

FOREIGN PATENT DOCUMENTS

| | | | |
|---|---|---|---|
| DE | 3908896 | A1 * | 9/1989 |
| JP | 2006-319020 | A | 11/2006 |
| JP | 2019-153642 | A | 9/2019 |
| JP | 2020-161563 | A | 10/2020 |

* cited by examiner

*Primary Examiner* — Malcolm Barnes
(74) *Attorney, Agent, or Firm* — Studebaker Brackett PLLC

(57) ABSTRACT

An inductor includes a core containing magnetic powder and a conductor embedded in the core. The core includes a mounting surface facing a mounting substrate side at the time of mounting, end surfaces orthogonal to the mounting surface, and side surfaces orthogonal to the mounting surface and the end surfaces. The conductor includes a conductive wire portion extending inside the core over the end surfaces and electrode portions at both end portions of the conductive wire portion and extending from the end surface of the core to the mounting surface. Each electrode portion is exposed to the side surfaces of the core, and in both end portions of the conductive wire portion, a shape of an edge portion corresponding to the side surface of the core is a cutout shape in which a location inside the core is cut out from a location connected to the electrode portion.

7 Claims, 16 Drawing Sheets

XI-XI SECTION

X-X SECTION

XI-XI SECTION

INDUCTOR

CROSS-REFERENCE TO RELATED APPLICATIONS

This application claims benefit of priority to Japanese Patent Application No. 2021-054171, filed Mar. 26, 2021, to Japanese Patent Application No. 2021-054172, filed Mar. 26, 2021, and to Japanese Patent Application No. 2021-054174, filed Mar. 26, 2021, the entire contents of each are incorporated herein by reference.

BACKGROUND

Technical Field

The present disclosure relates to an inductor.

Background Art

Japanese Patent Application Laid-Open No. 2019-153642 describes an inductor in which a terminal portion of a metal plate led out from a core is subjected to solder plating, and then the terminal portion is bent to serve as an external terminal.

SUMMARY

For example, in an inductor that handles a large current such as a power supply circuit, in order to suppress DC resistance to be low, an external terminal can be formed to have the entire width of the core such that both side end portions (electrode side surfaces) in a width direction are exposed to both side surfaces of the core.

However, depending on the shape of the electrode side surface exposed to the side surface of the core, when the inductor is mounted on a circuit board, a size of a solder-solidified portion formed on the side surface of the core increases, and for example, high-density mounting of the inductor and other electronic components on the circuit board may be difficult.

Accordingly, the present disclosure provides a configuration capable of preventing an increase in size of a solder-solidified portion at the time of mounting an inductor on a circuit board while suppressing DC resistance in the inductor including a metal plate embedded in a core.

According to an aspect the present disclosure, there is provided an inductor including a core containing magnetic powder; and a conductor embedded in the core. the core includes a mounting surface facing a mounting substrate side at a time of mounting, a pair of end surfaces orthogonal to the mounting surface, and a pair of side surfaces orthogonal to the mounting surface and the pair of end surfaces. The conductor includes a conductive wire portion extending inside the core over the pair of end surfaces and a pair of electrode portions provided at both end portions of the conductive wire portion and extending from the end surface of the core to the mounting surface. The electrode portion is exposed to the side surface of the core, and in both end portions of the conductive wire portion, a shape of an edge portion corresponding to the side surface of the core is a cutout shape in which a location inside the core is cut out from a location connected to the electrode portion.

According to another aspect the present disclosure, in the inductor, a nickel (Ni) plating layer and a tin (Sn) plating layer are formed at a portion of the surface of the electrode portion exposed from the side surface of the core.

According to the present disclosure, in an inductor including a metal plate embedded in a core, it is possible to prevent an increase in size of a solder-solidified portion at the time of mounting the inductor on a circuit board while suppressing DC resistance to be low.

DETAILED DESCRIPTION

Hereinafter, embodiments of the present disclosure will be described with reference to the drawings.

Figure 1:
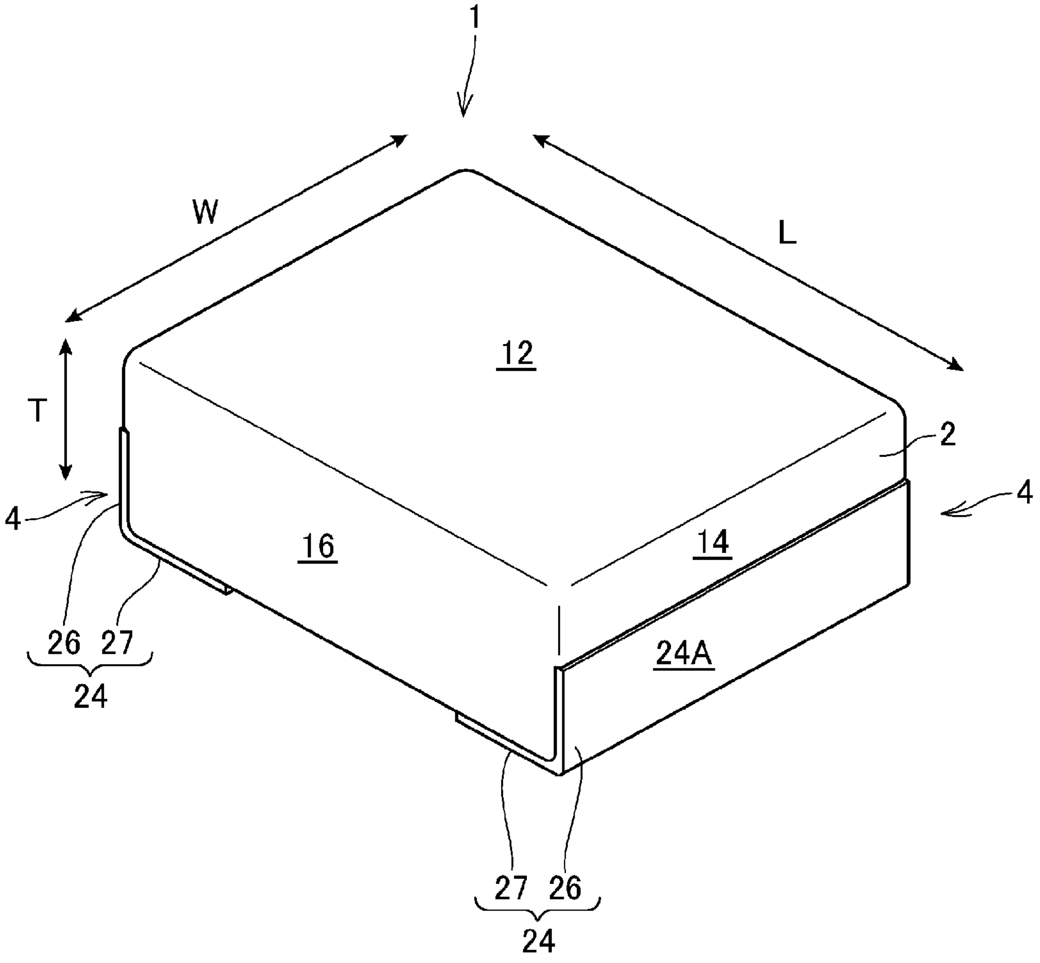
FIG. 1 is a perspective view when an inductor according to an embodiment of the present disclosure is viewed from an upper surface side.
Figure 2:
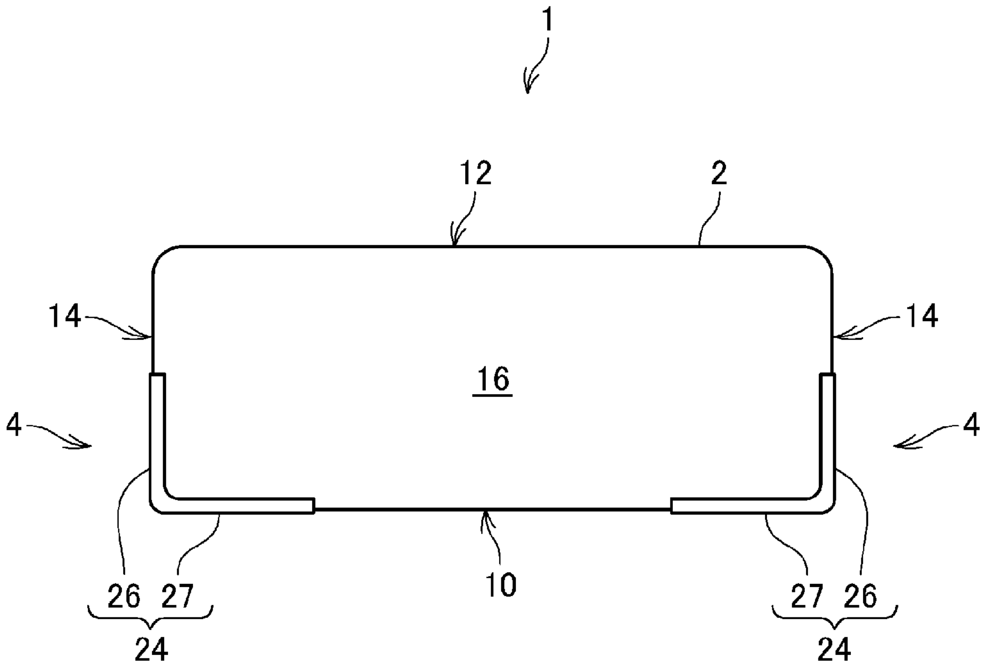
FIG. 2 is a plan view of a side surface of the inductor.
Figure 3:
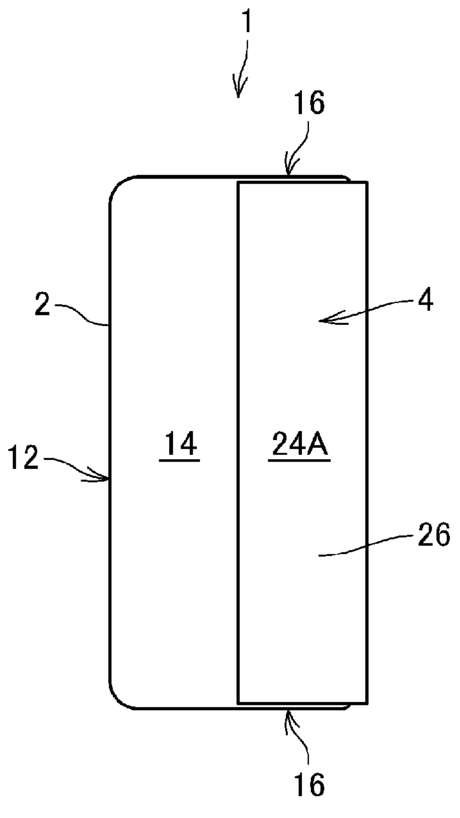
FIG. 3 is a plan view of an end surface of the inductor.
Figure 4:
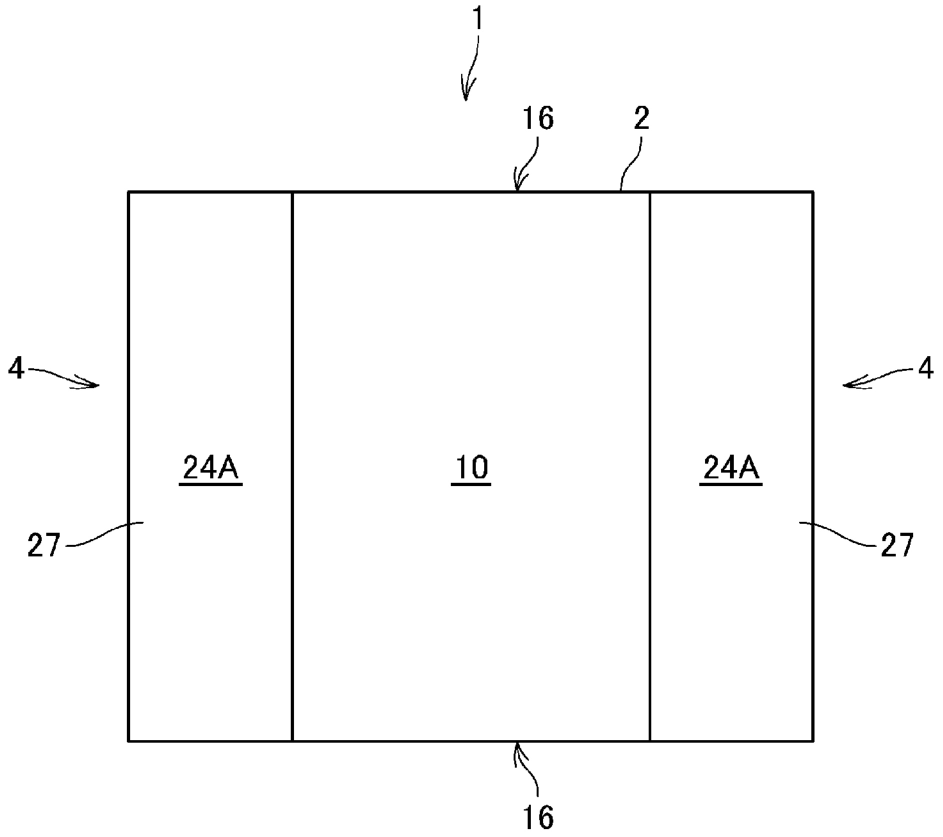
FIG. 4 is a plan view of a mounting surface of the inductor.

FIG. 1 is a perspective view when an inductor 1 according to the present embodiment is viewed from an upper surface 12 side. FIG. 2 is a plan view of a side surface 16 of the inductor 1, FIG. 3 is a plan view of an end surface 14 of the inductor 1, and FIG. 4 is a plan view of a mounting surface 10 of the inductor 1.

The inductor 1 of the present embodiment is configured as a surface mount electronic component, and includes an element body 2 having a substantially rectangular parallelepiped shape and a pair of external electrodes 4 provided on the surface of the element body 2.

Hereinafter, in the element body 2, a surface facing a mounting substrate (not illustrated) at the time of mounting is defined as a mounting surface 10 (FIG. 4), a surface facing the mounting surface 10 is referred to as an upper surface 12, a pair of surfaces orthogonal to the mounting surface 10 is referred to as end surfaces 14, and a pair of surfaces orthogonal to the mounting surface 10 and the pair of end surfaces 14 is referred to as side surfaces 16.

As illustrated in FIG. 1, a distance from the mounting surface 10 to the upper surface 12 is defined as a thickness T of the element body 2, a distance between the pair of side surfaces 16 is defined as a width W of the element body 2, and a distance between the pair of end surfaces 14 is defined as a length L of the element body 2.

Figure 5:
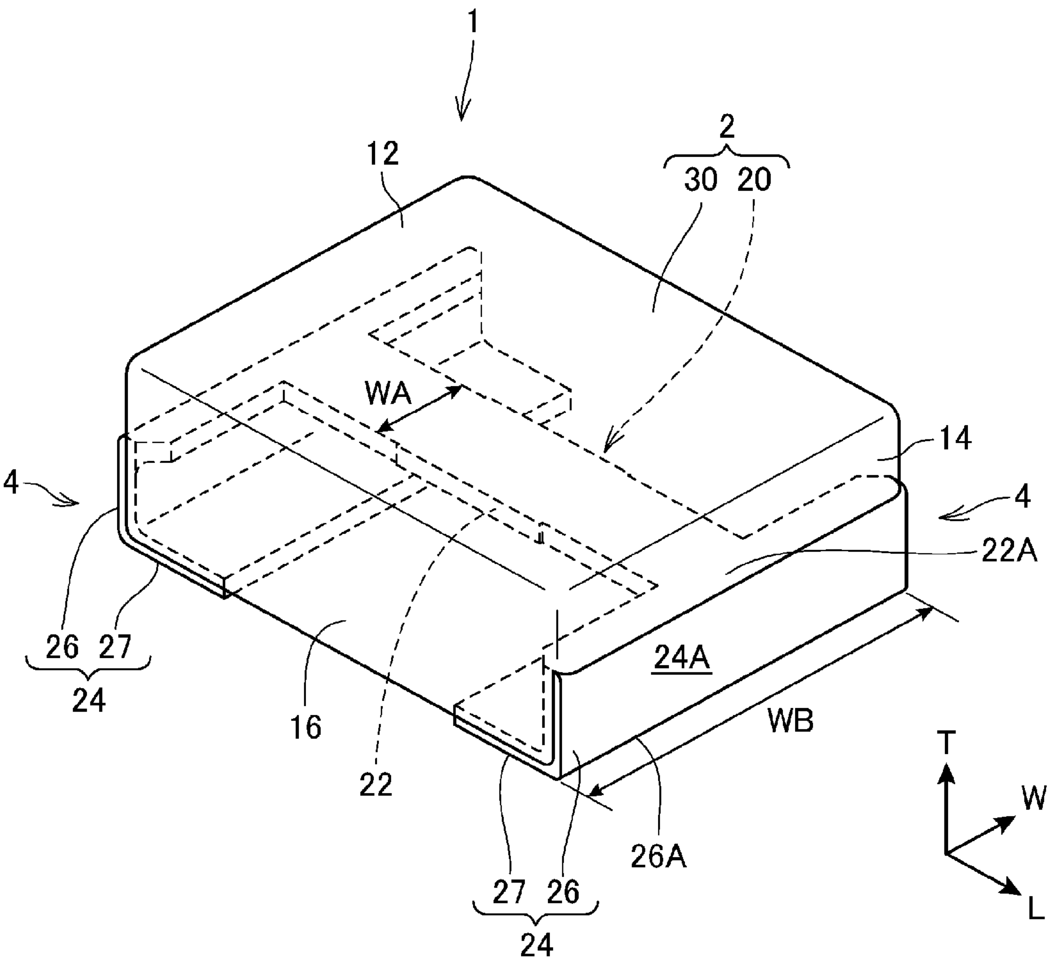
FIG. 5 is a perspective view illustrating an internal configuration of the inductor.

FIG. 5 is a perspective view illustrating an internal configuration of the inductor 1.

The element body 2 includes a conductor 20 and a core 30 having a substantially rectangular shape in which the conductor 20 is embedded, and is configured as a conductor-sealed magnetic component in which the conductor 20 is sealed in the core 30.

The core 30 is a molded body obtained by compression-molding a mixed powder obtained by mixing a magnetic powder and a resin into a substantially rectangular parallelepiped shape by pressurizing and heating the mixed powder in a state where the conductor 20 is incorporated in the core. There is an oxide insulating film oxidized more than the inside of the core 30 on the surface of the core 30. In the mixed powder of the present embodiment, barium sulfate is mixed as a lubricant in addition to the magnetic powder and the resin.

The mixed powder of the present embodiment has a resin amount of about 3.1 wt % with respect to the magnetic powder.

In addition, the magnetic powder of the present embodiment includes particles having two types of particle sizes, that is, large first magnetic particles having a relatively large average particle diameter and small second magnetic particles having a relatively small average particle diameter. During the compression molding, the small second magnetic particles enter between the large first magnetic particles together with the resin, so that a filling factor of the core 30 can increase, and magnetic permeability can also increase.

Here, a compounding ratio (weight ratio) of the first magnetic particles and the second magnetic particles is 70:30 to 85:15, preferably 70:30 to 80:20, and 75:25 in the present embodiment.

In addition, a ratio of the average particle diameter of the first magnetic particles to the average particle diameter of the second magnetic particles is preferably 5.0 or more.

Note that the magnetic powder may include particles having an average particle diameter between the average particle diameters of the first magnetic particles and the second magnetic particles, and thus, includes particles having three or more kinds of particle sizes.

In the present embodiment, each of the first magnetic particles and the second magnetic particles is a particle having a metal particle and an insulating film covering the surface the metal particle, the metal particle is made of Fe—Si-based amorphous alloy powder, and the insulating film is made of zinc phosphate. By covering the metal particles with the insulating film, insulating resistance and withstand voltage increase.

In the first magnetic particles, Cr-less Fe—C—Si alloy powder, Fe—Ni—Al alloy powder, Fe—Cr—Al alloy powder, Fe—Si—Al alloy powder, Fe—Ni alloy powder, and Fe—Ni—Mo alloy powder may be used as the metal particles.

In the first magnetic particles and the second magnetic particles, another phosphate (magnesium phosphate, calcium phosphate, manganese phosphate, cadmium phosphate, or the like) or a resin material (silicone-based resin, epoxy-based resin, phenol-based resin, polyamide-based resin, polyimide-based resin, polyphenylene sulfide-based resin, and the like) may be used for the insulating film.

In the mixed powder of the present embodiment, an epoxy resin containing a bisphenol A type epoxy resin as a main agent is used as a material of the resin.

The epoxy resin may be a phenol novolak-type epoxy resin.

The material of the resin may be other than the epoxy resin, and may be two or more kinds instead of one kind. For example, as the material of the resin, a thermosetting resin such as a phenol resin, a polyester resin, a polyimide resin, or a polyolefin resin can be used in addition to the epoxy resin.

As illustrated in FIG. 5, the conductor 20 includes a conductive wire portion 22 extending inside the core 30 over the pair of end surfaces 14, and an electrode portion 24 integrally formed at both ends of the conductive wire portion 22.

A surface 24A of the electrode portion 24 is exposed from each of the end surface 14 of the core 30 and the mounting surface 10, and nickel (Ni) plating and tin (Sn) plating are sequentially applied to the surfaces 24A to form the external electrode 4 in order to secure mountability. Then, the external electrode 4 formed on the mounting surface 10 is electrically connected to a wire of a circuit board by appropriate mounting means such as solder.

In the present embodiment, as illustrated in FIGS. 1 to 5, the electrode portion 24 of the conductor 20 is embedded in the core 30 in a state where only the surface 24A is substantially exposed on the mounting surface 10 and the end surface 14, and thus, an amount of protrusion of the electrode portion 24 from the core 30 is suppressed. As a result, since it is hardly necessary to consider the protrusion of the electrode portion 24, the core 30 can be made as large as a specified size of the inductor 1, and the inductor 1 having a small size and a low height but high performance can be realized.

When a length of the conductive wire portion 22 in the direction of the width W of the core 30 is defined as a conductive wire portion width WA and a length of the electrode portion 24 is defined as an electrode width WB, as illustrated in FIG. 5, the electrode width WB of the electrode portion 24 of the present embodiment is wider than the conductive wire portion width WA, and the resistance in DC resistance is reduced.

The electrode portion 24 is formed in a substantially L shape in an LT cut surface on an LT plane including the respective directions of a length L and a thickness T of the core 30.

Specifically, the electrode portion 24 includes a first electrode portion 26 that extends while being bent substantially vertically at the end portion 22A of the conductive wire portion 22 and a second electrode portion 27 that extends while being bent substantially vertically at a lower end portion 26A of the first electrode portion 26, and the first electrode portion 26 and the second electrode portion 27 form an L shape. The surfaces 24A of the first electrode portion 26 and the second electrode portion 27 are exposed from the end surface 14 and the mounting surface 10 of the core 30 to constitute the external electrode 4.

According to the electrode portion 24, as compared with a case where the conductive wire portion 22 and the electrode portion 24 (external electrode 4) are configured separately, since there is no joint surface between the conductive wire portion 22 and the electrode portion 24 (external electrode 4) which are low electrical resistance regions where a current mainly flows in the external electrode 4, a resistance value can be suppressed, and a large current can flow.

Furthermore, the conductor 20 of the present embodiment is formed of tough pitch copper, and allows a larger current to flow.

Based on the above configuration, the inductor 1 according to the present embodiment has an inductance value of about 10 nH or more in a size of about 2.5 mm in length L, about 2.0 mm in width W, and about 1.0 mm in thickness T, and is capable of achieving performance of about 0.85 mΩ or less in DC resistance, 15 A or more in rated current for temperature rise (when the temperature rises by 40° C.), and 15 A or more in DC superposed current (when the frequency is 1 MHz).

The inductor 1 is used as a power supply circuit including a charge pump type DC-DC converter that boosts a voltage by a capacitor and a switch and an LC filter, and an impedance matching coil (matching coil) of a high frequency circuit, and is used for electronic devices such as a personal computer, a DVD player, a digital camera, a TV, a mobile phone, a smartphone, car electronics, and medical/industrial machines. However, the application of the inductor 1 is not limited thereto, and the inductor 1 can also be used for, for example, a tuning circuit, a filter circuit, a rectifying and smoothing circuit, and the like.

In the inductor 1, an element-body protective layer may be formed on the entire surface of the element body 2 excluding the range of the external electrode 4. As a material of the element-body protective layer, for example, a thermosetting resin such as an epoxy resin, a polyimide resin, or a phenol resin, or a thermoplastic resin such as a polyethylene resin or a polyamide resin can be used. These resins may further contain a filler containing silicon oxide, titanium oxide, or the like.

Figure 6:
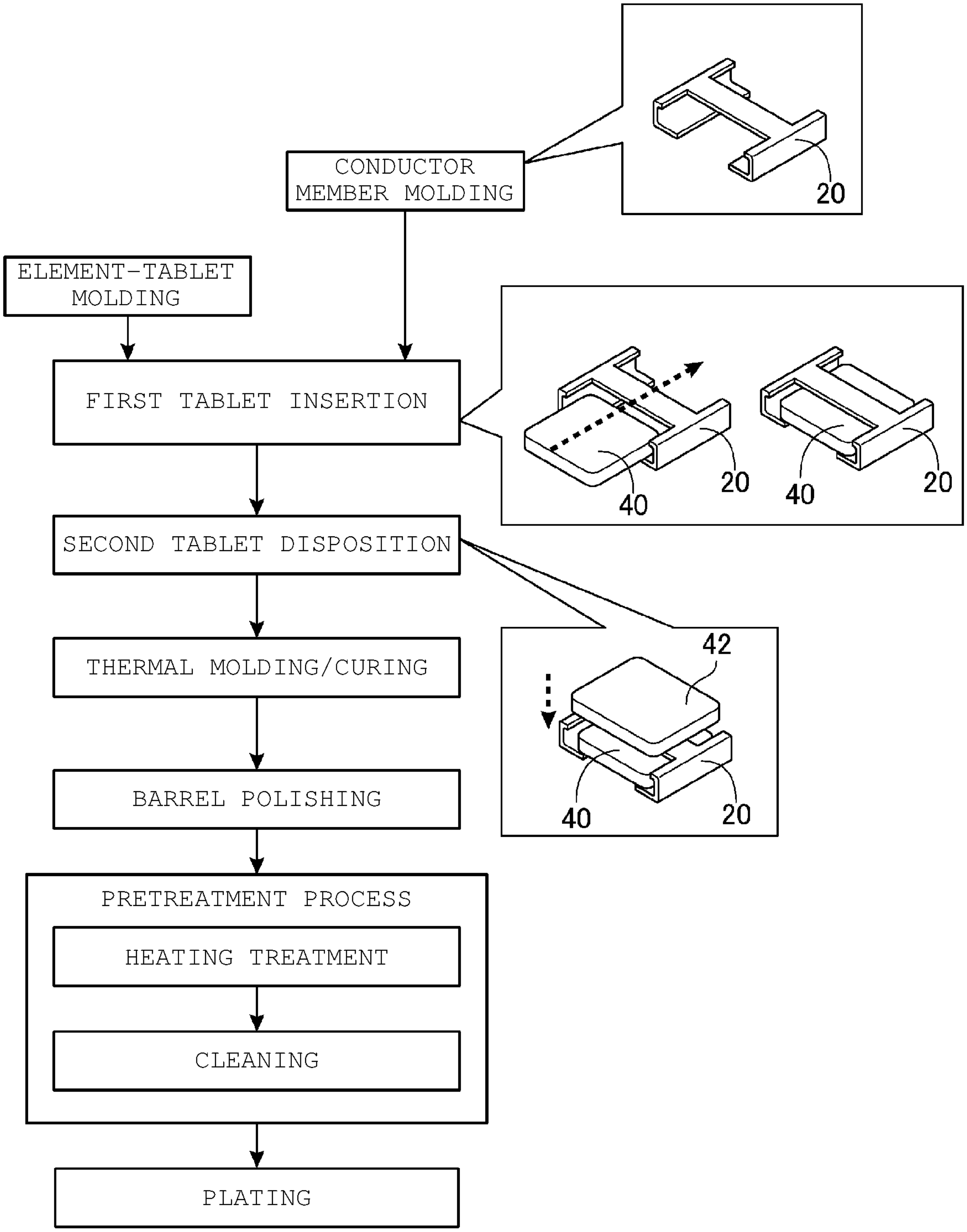
FIG. 6 is a schematic view of a manufacturing process of the inductor.

FIG. 6 is a schematic diagram of a manufacturing process of the inductor 1.

As illustrated in the drawing, the manufacturing process of the inductor 1 includes a conductor member molding process, an element-body tablet molding process, a first tablet inserting process, a second tablet disposing process, a thermal molding/curing process, a barrel polishing process, a pretreatment process, and a plating process.

The conductor member molding process is a process of molding the conductor 20.

In the present embodiment, first, a copper piece having a predetermined shape is formed by punching a copper plate having a predetermined thickness, and then the conductor 20 is formed by bending the copper piece. In this case, the first electrode portion 26 and the second electrode portion 27 of the electrode portion 24 are also bent. That is, by this conductor member molding process, the conductor 20 is formed which integrally includes the conductive wire portion 22 and the electrode portion 24 and in which the first electrode portion 26 and the second electrode portion 27 of the electrode portion 24 are also molded in advance (that is, preformed) before being embedded in the core 30.

The tablet molding process is a process of molding two preform bodies of a first tablet 40 and a second tablet 42.

The preform body is molded into a solid state which is easy to handle by pressurizing the mixed powder which is a material of the element body 2. Each of the first tablet 40 and the second tablet 42 is a preform body disposed on a lower side and an upper side of the conductive wire portion 22 of the conductor 20, and is molded in a substantially plate shape.

The first tablet inserting process is a process of inserting the first tablet 40 between the pair of electrode portions 24 on the lower side of the conductive wire portion 22 of the conductor 20 after setting the conductor 20 in a molding die. More specifically, the conductor 20 is provided with the electrode portion 24 having an L shape in the LT section at both end portions 22A of the conductive wire portion 22, and thus, the LT section has a substantially C shape, and the first tablet 40 is inserted into a space surrounded by the conductive wire portion 22 and the pair of electrode portions 24.

The second tablet disposing process is a process of placing the second tablet 42 on the conductive wire portion 22 of the conductor 20.

In the thermal molding/curing process, the first tablet 40, the conductor 20, and the second tablet 42 are integrated by applying heat to the first tablet 40 and the second tablet 42 set in the molding die while pressurizing the first tablet 40 and the second tablet 42 in an overlapping direction of the first tablet 40 and the second tablet 42 and curing them. As a result, a molded body including the conductor 20 is molded.

As described above, since the first tablet 40 is molded in a state of being accommodated in the space surrounded by the conductive wire portion 22 and the pair of electrode portions 24, the conductive wire portion 22 is embedded in the molded body, and the molded body in which the surface of the electrode portion 24 including the first electrode portion 26 and the second electrode portion 27 is exposed to be substantially flush with the core 30 is obtained. In addition, since the first electrode portion 26 and the second electrode portion 27 of the electrode portion 24 are formed in the conductor member molding process in advance, processing for forming the first electrode portion 26 and the second electrode portion 27 is not required for the molded body after molding.

The barrel polishing process is a process of barrel polishing the molded body, and a corner portion of the molded body is rounded by the process.

In the pretreatment process, heating treatment and cleaning treatment are performed as surface treatment of the molded body for the next plating process. In the plating process, nickel (Ni) plating and tin (Sn) plating are sequentially applied to a surface 24A of the electrode portion 24 by barrel plating.

Plating Layer Formed Location

In the inductor 1 according to the present embodiment, the conductor 20 is formed by bending a conductive plate that has not been plated in the conductor member molding process. Then, in a subsequent process, the conductor 20 is embedded in the core 30 such that the surface 24A of the electrode portion 24 of the conductor 20 is exposed from the core 30, and then plating is applied to the exposed surface 24A in the plating process.

Therefore, in the electrode portion 24, occurrence of defects such as cracks and peeling of the plating layer due to bending of the conductive plate after the plating layer forming as in the conventional case is prevented.

Further, in the inductor 1 according to the present embodiment, in order to suppress the DC resistance of the conductor 20 to be low, the electrode width WB of the first electrode portion 26 and the second electrode portion 27 is the same width as the width W of the core 30, and the inductor 1 is configured such that the side surfaces of the first electrode portion 26 and the second electrode portion 27 are exposed from the core 30. Hereinafter, the side surface of the electrode portion 24 is also referred to as an electrode side surface.

Then, in the plating process, a plating layer is formed on the entire portion of the conductor 20 exposed from the core 30, including the surface 24A, by barrel plating. Therefore, plating layers are also formed on the electrode side surfaces of the first electrode portion 26 and the second electrode portion 27 exposed from the side surface 16 of the core 30 in FIG. 5.

As a result, in the present embodiment, a good plating layer without cracks, peeling, or the like is formed on the entire portion of the electrode portion 24 exposed from the core 30 without using a process such as masking at the time of plating and thus without complicating a manufacturing process, and a good mounting state of the inductor 1 on a circuit board or the like can be realized.

In addition, since the surface of the electrode portion 24 facing the surface 24A is embedded in the core 30 which is a molded body, when the inductor 1 is mounted on a circuit board or the like, solder is prevented from entering between the electrode portion 24 and the core 30. Therefore, in the inductor 1, it is possible to prevent a decrease in reliability and deterioration in electrical characteristics of the inductor 1 due to entry of the solder when the inductor 1 is mounted on a circuit board or the like.

The conductor member molding process illustrated in FIG. 6 corresponds to a process of forming the conductor 20 by bending the conductive plate. The first tablet inserting process, the second tablet disposing process, and the thermal molding/curing process illustrated in FIG. 6 correspond to a process of embedding the conductor 20 in the core 30 such that a portion of the conductor 20 is exposed from the core 30. The plating process illustrated in FIG. 6 corresponds to a process of plating the surface portion of the conductor 20 exposed from the core 30.

Figure 7:
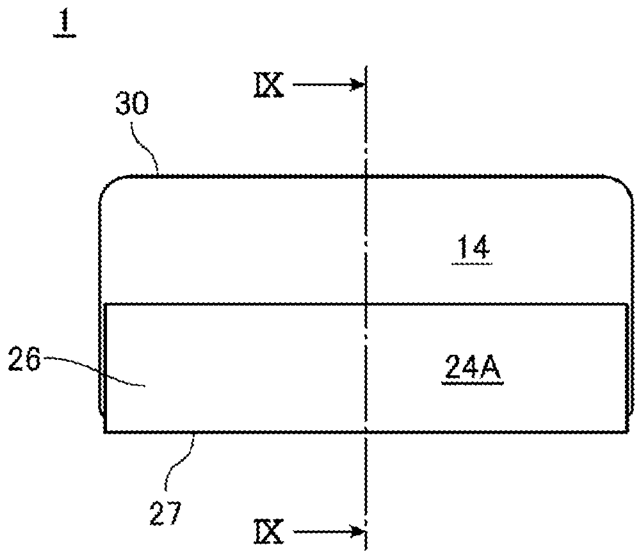
FIG. 7 is a plan view of an end surface of the inductor.
Figure 8:
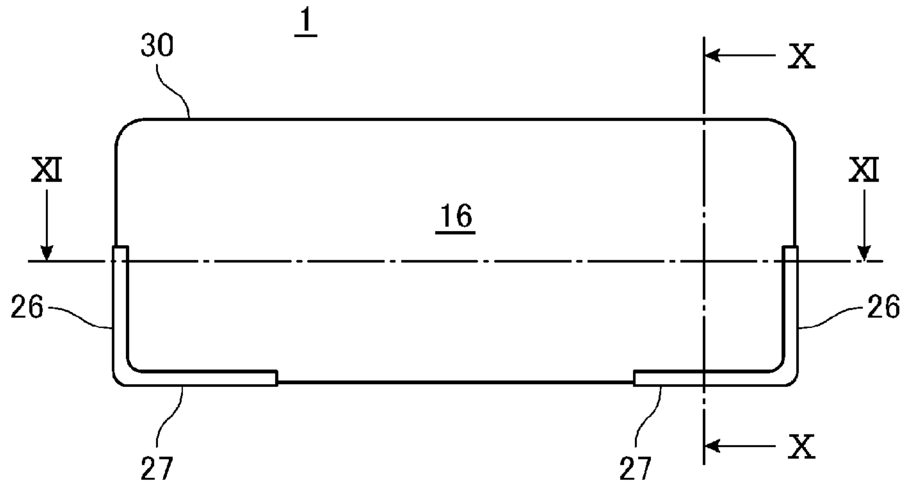
FIG. 8 is a plan view of a side surface of the inductor.
Figure 9:
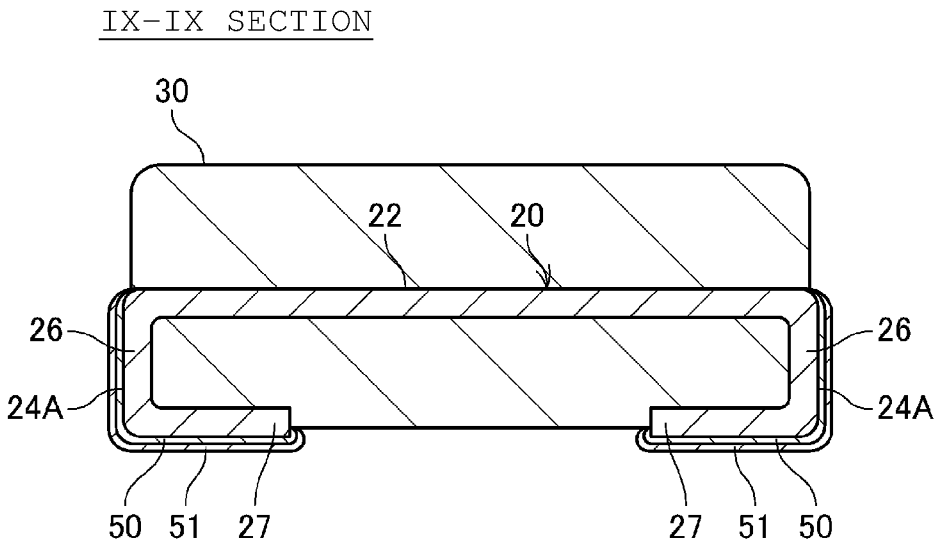
FIG. 9 is a sectional view taken along line IX-IX of the inductor illustrated in FIG. 7.

FIG. 7 is the same as FIG. 3 and is a plan view of the end surface 14 of the inductor 1, and FIG. 8 is the same as FIG. 2 and is a plan view of the side surface 16 of the inductor 1. FIG. 9 is a sectional view taken along line IX-IX of FIG. 7, FIG. 10 is a sectional view taken along line X-X of FIG. 8, and FIG. 11 is a sectional view taken along line XI-XI of FIG. 8.

Figure 10:
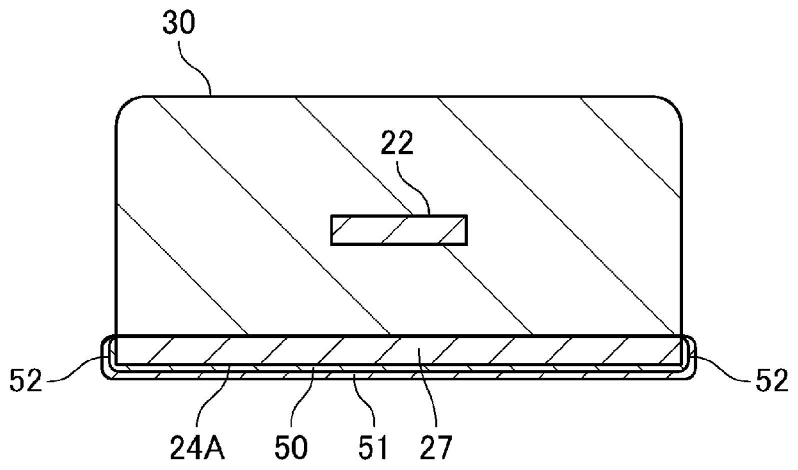
FIG. 10 is a sectional view taken along line X-X of the inductor illustrated in FIG. 8.
Figure 11:
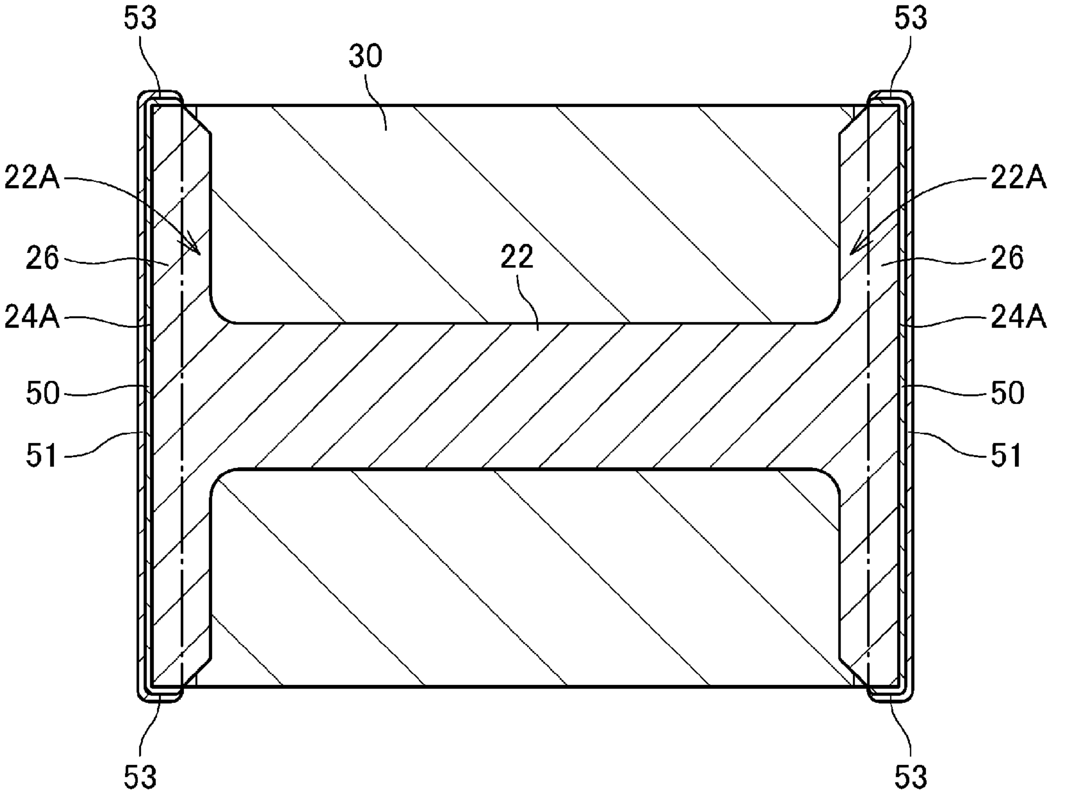
FIG. 11 is a sectional view taken along line XI-XI of the inductor illustrated in FIG. 8.

In FIGS. 9, 10, and 11, a Ni plating layer 50 and a Sn plating layer 51 are formed on portions (including the surface 24A) of the first electrode portion 26 and the second electrode portion 27 of the conductor 20 exposed from the core 30. Of the first electrode portion 26 and the second electrode portion 27, the surface facing the surface exposed from the core 30 including the surface 24A is embedded in the core 30, and no plating layer is formed.

As described above, in the inductor 1 according to the present embodiment, the Ni plating layer 50 and the Sn plating layer 51 are also formed on the electrode side surface 52 of the second electrode portion 27 exposed from the core 30 in FIG. 10 and the electrode side surface 53 of the first electrode portion 26 exposed from the core 30 in FIG. 11.

Shape of Electrode Side Surface Exposed to Core Side Surface

As described above, in the inductor 1, the plating layers are formed on the electrode side surfaces of the first electrode portion 26 and the second electrode portion 27 exposed from the side surface 16 of the core 30. Therefore, when the inductor 1 is mounted on a circuit board or the like by soldering, the solder rises up to the electrode side surface having good solder wettability, and thus, fixing strength of the inductor 1 with respect to the circuit board or the like is improved as compared with the case where the electrode side surface is not exposed from the core 30.

However, depending on the shape of the electrode side surface exposed to the side surface 16 of the core 30, the size of the solder-solidified portion formed on the side surface 16 of the core 30 increases, and for example, high-density mounting of the inductor 1 and other electronic components on the circuit board may be difficult.

Figure 12:
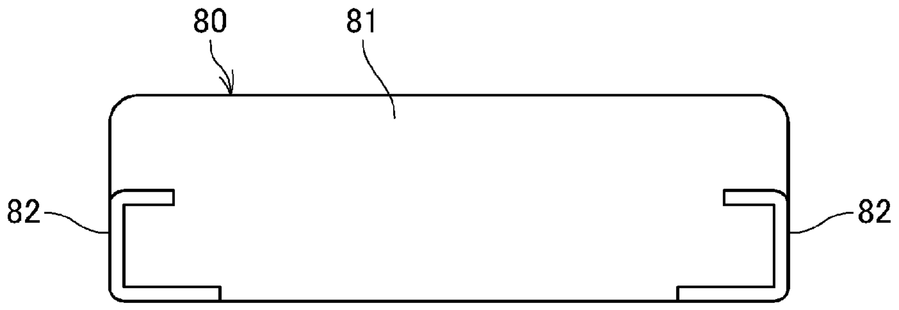
FIG. 12 RELATED ART
FIG. 12 is an example of a shape of an electrode side surface on a side surface of an inductor in the related art.
Figure 13:
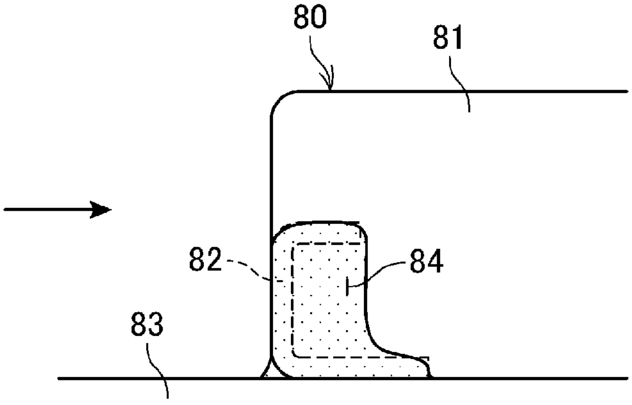
FIG. 13 RELATED ART
FIG. 13 is an example of a shape of a solder-solidified portion formed on the electrode side surface in the related art illustrated in FIG. 12.
Figure 14:
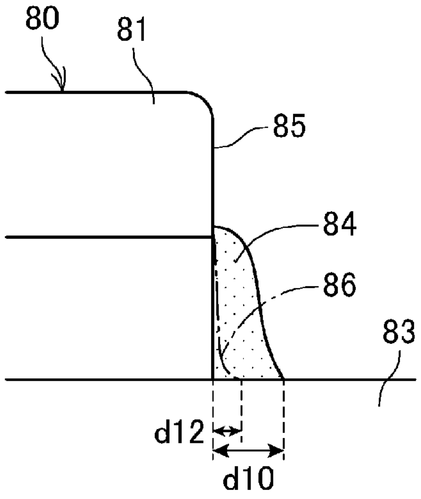
FIG. 14 RELATED ART
FIG. 14 is a view when the solder-solidified portion illustrated in FIG. 13 is viewed from a direction of an arrow illustrated in FIG. 13.

FIG. 12 illustrates an example of a shape of an electrode side surface formed on a molded body side surface of an inductor as a related art of the present embodiment. FIG. 13 is an example of a shape of a solder-solidified portion formed on an electrode side surface 82 on a left side in FIG. 12 in a case where an inductor 80 illustrated in FIG. 12 is mounted on a circuit board 83. FIG. 14 is a view when the solder-solidified portion illustrated in FIG. 13 is viewed from a direction of an arrow in illustrated in FIG. 13.

In the example illustrated in FIG. 12, the electrode side surface 82 is exposed in a substantially C shape from a side surface of a molded body 81 of the inductor 80. As illustrated in FIG. 13, when the inductor 80 is mounted on the circuit board 83, a solder-solidified portion 84 can be formed so as to cover the surface of the molded body 81 surrounded by the electrode side surface 82 in a substantially C shape. The solder-solidified portion 84 is formed in a lump shape so as to bridge between portions (for example, a portion between a substantially C-shaped upper portion in the drawing and a substantially C-shaped lower portion in the drawing) of the electrode side surface 82 across the surface of the molded body 81 having poor solder wettability. Therefore, as illustrated in FIG. 14, a protrusion distance d10 of the solder-solidified portion 84 from a side surface 85 of the molded body 81 is longer than a protrusion distance d12 of a solder-solidified portion 86 (so-called solder fillet indicated by alternate long and short dash line in the drawing) when such a bridge is not formed. As a result, it is difficult for the inductor 80 according to the related art illustrated in FIG. 12 to perform high-density mounting with other electronic components on a circuit board.

Therefore, in order to enable high-density mounting on the circuit board, the inductor 1 according to the embodiment of the present disclosure is configured such that only the electrode side surfaces of the first electrode portion 26 and the second electrode portion 27 are exposed in a substantially L shape on the side surface 16 of the core 30, and the electrode side surface of the conductive wire portion 22 is not exposed on the side surface 16 of the core 30.

Specifically, in both end portions of the conductive wire portion 22, a shape of an edge portion corresponding to the side surface 16 of the core 30 is a cutout shape in which a location inside the core 30 is cut out from a location connected to the electrode portion 24.

Figure 15:
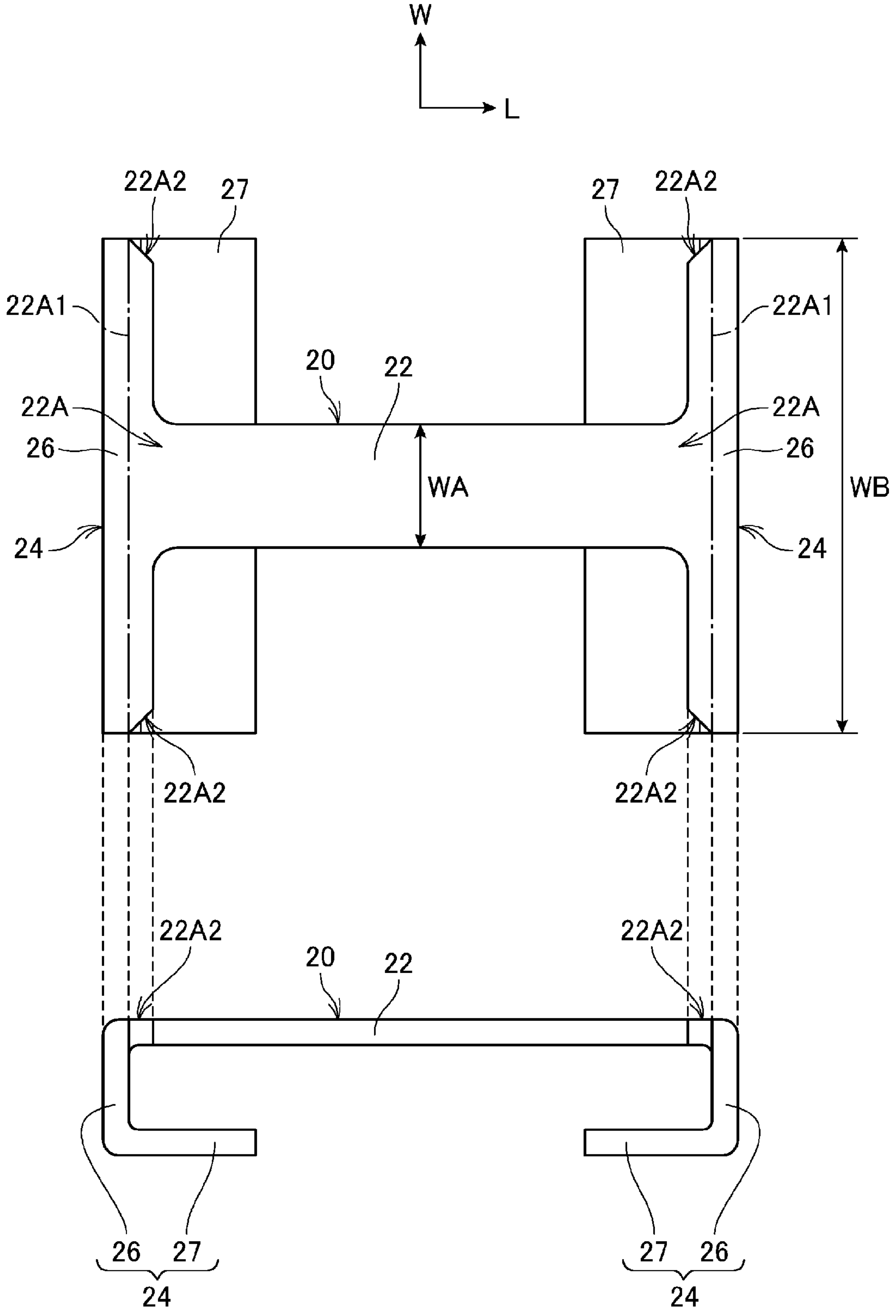
FIG. 15 is a view illustrating a configuration of a conductor of the inductor according to the present embodiment.

FIG. 15 is a view illustrating a configuration of the conductor 20. An upper side of FIG. 15 is a plan view of the conductor 20 as viewed from the upper surface 12 side of the inductor 1, and a lower side of FIG. 15 is a side view of the conductor 20 as viewed from the side surface 16 side of the inductor 1. In the upper side of FIG. 15, in the conductive wire portion 22, both end portions 22A provided with the electrode portion 24 have a shape (substantially H shape in plan view from the upper surface 12) extending in the direction of the width W of the inductor 1. A width of an electrode connection location 22A1 connected to the electrode portion 24 at the end portion 22A is wider than the conductive wire portion width WA, and is the same electrode width WB as the electrode portion 24. As a result, a DC resistance value of the conductor 20 is further reduced.

Here, since the electrode width WB is the same as the width W of the core 30, the electrode portion 24 is exposed to the pair of side surfaces 16 of the core 30. Meanwhile, in the conductive wire portion 22, although the width of the electrode connection location 22A1 of the end portion 22A is the electrode width WA, both sides of the end portion 22A in the direction of the width W of the core 30 are cut out by C chamfering so as not to be exposed from the pair of side surfaces 16 of the core 30.

Specifically, in the end portion 22A of the conductive wire portion 22, the edge portion 22A2 located in the direction of the width W of the core 30 is located on the side surface 16 side of the core 30, but has a cutout shape in which the location inside the core 30 from the electrode connection location 22A1 is cut out by the C chamfering. Since the edge portion 22A2 of the end portion 22A has a cutout shape in this manner, though the width of the electrode connection location 22A1 at the end portion 22A is equal to the electrode width WB of the electrode portion 24, only the electrode portion 24 of the conductive wire portion 22 and the electrode portion 24 is exposed on the side surface 16 of the core 30, and the conductive wire portion 22 is not exposed. Therefore, on the side surface 16 of the core 30, the conductor 20 does not have a C shape as illustrated in FIG. 12, but has a substantially L shape as illustrated in FIG. 2. Therefore, since the conductor 20 exposed on the side surface 16 of the core 30 cannot form the massive solder-solidified portion 84 straddling the surface of the core 30 as illustrated in FIGS. 13 and 14 on the side surface 16, the inductor 1 can be mounted on the circuit board with high density together with other electronic components.

The method of forming the edge portion 22A2 of the end portion 22A into a cutout shape is not limited to chamfering. For example, in the conductor member molding process described above, a copper plate may be punched in a shape including the cutout shape of the edge portion 22A2 of the end portion 22A at the time of punching.

Prevention of Unnecessary Plating

As described above, in the present embodiment, plating is applied to the electrode portion 24 by barrel plating in the plating process. Accordingly, as illustrated in FIGS. 9, 10, and 11, a plating layer is formed on the entire portion of the electrode portion 24 (the first electrode portion 26 and the second electrode portion 27) exposed from the core 30, and the inductor 1 can be favorably mounted on a circuit board or the like.

However, on the other hand, at the time of barrel plating, since the entire element body 2 including the core 30 and the conductor 20 is immersed in an electrolytic solution of barrel plating, depending on the surface state of the core 30, a portion of the surface of the core 30 is charged, and a phenomenon (plating elongation) in which a plating layer to be formed only in the range of the electrode portion 24 unintentionally spreads toward the surface of the core 30 beyond the range of the electrode portion 24 may occur.

Figure 16:
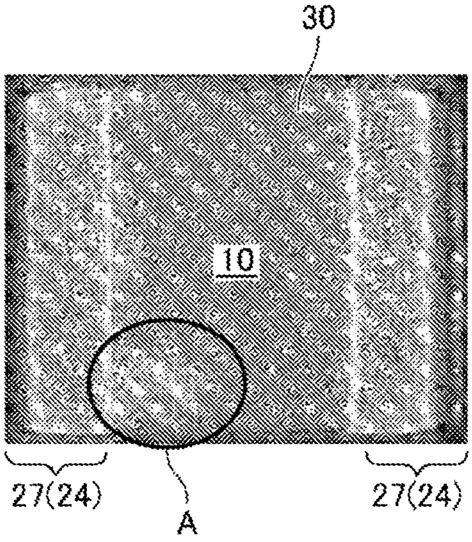
FIG. 16 illustrates an example of plating elongation formed on a mounting surface of a core.

FIG. 16 is a view illustrating an example of the plating elongation formed on the mounting surface 10 of the core 30. In the illustrated example, dotted plating portions (white spots dotted on the surface of the core 30) dispersed from the edge portion of the second electrode portion 27 of the electrode portion 24 toward the surface of the core 30 are formed, and the dotted plating is most prevalent in a region surrounded by an ellipse A.

The inventors of the present disclosure have extensively conducted studies on a relationship between various surface treatment conditions (heating temperature and holding time) for the element body 2 and occurrence frequency of the plating elongation, and have found that plating elongation is effectively prevented by heating the element body 2 in the air atmosphere to change the surface state of the core 30 as plating pretreatment.

Therefore, in the present embodiment, as described above, in the pretreatment process for the plating process, the heating process of heating the core 30 after the barrel polishing to treat the surface of the core 30, and the cleaning process of etching and cleaning the surface of the electrode portion 24 after the heating are performed.

Table 1 below illustrates a relationship between the heating treatment conditions of the element body 2 in the air atmosphere in the heating process and an occurrence rate of plating elongation in the subsequent barrel plating. In Table 1, a first line (uppermost line) indicates a sample number, a second line indicates the heating temperature in the heating treatment, a third line indicates the holding time of the heating temperature, and a fourth line indicates an occurrence probability of plating elongation in the subsequent barrel plating. The total number of samples for each sample number is 500, and the plating elongation occurrence probability indicates a ratio of the number of samples in which the plating elongation has occurred to the total number of samples in each sample number. With respect to the presence or absence of occurrence of the plating elongation, it was determined that there was plating elongation when the plating was elongated by 30% or more of the electrode width WB in the L direction. The heating temperature illustrated in Table 1 is an ambient temperature in the furnace in the oven used for heating the sample.

From Table 1, the heating treatment conditions necessary for preventing the plating elongation are at least a heating temperature of 200° C. or more and a holding time of 30 minutes or more. When manufacturing variations and the like are taken into consideration, it is preferable that a margin of about 10 minutes is included in the holding time, and the heating treatment conditions are set to 200° C. or more and the holding time is set to 40 minutes or more. Such an effect of preventing the plating elongation by performing the heating treatment is considered to be due to the fact that the surfaces of the magnetic particles exposed on the surface of the core 30 for the barrel polishing or the like are oxidized by heating in the atmosphere to form an oxide insulating film. That is, it is considered that since an oxide insulating film is formed on the surface of the magnetic particle exposed on the surface of the core 30 as described above, the entire surface of the core 30 has good electrical insulation properties, and as a result, deposition of plating metal on the surface of the core 30 during the barrel plating (electrolytic plating) is prevented, and the plating elongation is prevented.

TABLE 1

| Sample number | Sample 1-1 | Sample 1-2 | Sample 1-3 | Sample 1-4 | Sample 1-5 |
|---|---|---|---|---|---|
| Heating temperature | No heating | 150° | 200° C. | 200° C. | 200° C. |
| Holding time | | 45 minutes | 10 minutes | 30 minutes | 45 minutes |
| Occurrence probability of plating elongation | 67.8% | 59.1% | 4.5% | 0.0% | 0.0% |

Since the entire element body 2 is heated in the heating treatment, the surface of the conductor 20 exposed from the core 30 is also oxidized. Therefore, in the present embodiment, as the pretreatment, the element body 2 is cleaned after the heating treatment. In the cleaning process, the oxide film on the surface of the conductor 20 exposed from the core 30 is removed by immersing (that is, by wet etching) the molded body in a liquid agent that dissolves only the member of the conductor 20.

As described above, the inductor 1 according to the above-described embodiment includes the core 30 containing magnetic powder and the conductor 20 embedded in the core 30. The core 30 includes the mounting surface 10 facing the mounting substrate side at the time of mounting, the pair of end surfaces 14 orthogonal to the mounting surface 10, and the pair of side surfaces 16 orthogonal to the mounting surface 10 and the pair of end surfaces 14. In addition, the conductor 20 includes the conductive wire portion 22 extending inside the core 30 across the pair of end surfaces 14, and the pair of electrode portions 24 provided at both end portions 22A of the conductive wire portion 22 and extending from the end surface 14 of the core 30 to the mounting surface 10. The electrode portion 24 is exposed to the side surface 16 of the core 30, and in both end portions of the conductive wire portion 22, the shape of the edge portion corresponding to the side surface 16 of the core 30 is a cutout shape in which the location inside the core 30 is cut out from the location connected to the electrode portion 24.

According to this configuration, in the inductor 1 including the conductor 20 embedded in the core 30, it is possible to prevent the size of the solder-solidified portion from increasing when the inductor 1 is mounted on the circuit board while suppressing the DC resistance to be low.

A nickel (Ni) plating layer and a tin (Sn) plating layer are formed at a location of the surface of the electrode portion 24 exposed from the side surface 16 of the core 30. According to this configuration, the tin plating layer 51 having good solder wettability can be formed with practically sufficient strength on the surfaces of the side surfaces of the first electrode portion 26 and the second electrode portion 27.

The manufacturing method according to the embodiment described above is a manufacturing method of the inductor 1 including the core 30 made of magnetic powder and resin and the conductor 20 embedded in the core 30, and includes a process of forming the conductor 20 by bending a conductive plate, a process of embedding the conductor 20 in the core 30 so that a portion of the conductor 20 is exposed from the core 30, and a process of plating a surface portion of the conductor 20 exposed from the core 30.

According to this configuration, since plating is performed on the portion exposed from the core 30 in the conductor 20 subjected to the bending in advance, it is possible to prevent occurrence of defects such as cracks and peeling of the plating layer due to bending of the conductive plate after formation of the plating layer as in the related art without complicating a manufacturing process by a process such as masking at the time of plating. Therefore, in the inductor 1, a defect of solder bonding due to a defect of the plating layer in the conductor 20 can be prevented, and a good mounting state on a circuit board or the like can be realized.

In the process of embedding the conductor 20 in the core 30, the conductor 20 is embedded in the core 30 such that the side surface of the electrode portion 24 which is a portion of the conductor 20 is exposed from the core 30. According to this configuration, since the plating layer is also formed on the side surface (electrode side surface) of the electrode portion 24 exposed from the core 30, the solder wettability of the side surface of the electrode portion 24 is improved, characteristic deterioration when the inductor 1 is mounted on a circuit board or the like is suppressed, and a good mounting state can be realized.

In addition, the core 30 includes the mounting surface 10 facing the mounting substrate side at the time of the mounting, the pair of end surfaces 14 orthogonal to the mounting surface 10, and the pair of side surfaces 16 orthogonal to the mounting surface 10 and the pair of end surfaces 14. The conductor 20 includes the conductive wire portion 22 extending inside the core 30 over the pair of end surfaces 14 in a state of being embedded in the core 30, and the pair of electrode portions 24 extending from the end surface 14 of the core 30 over the mounting surface 10. In the process of embedding the conductor 20 in the core 30, the conductor 20 is embedded in the core 30 such that the surface 24A, which is one surface of the electrode portion 24, is exposed from the mounting surface 10, the other surface facing the one surface is embedded in the core 30, and the side surface (electrode side surface) of the electrode portion 24 is exposed from the side surface of the core 30.

According to this configuration, since the plating layer is also formed on the side surface (electrode side surface) of the electrode portion 24 exposed from the core 30, the solder wettability of the electrode side surface of the electrode portion 24 is improved, and a good mounting state can be realized when the inductor 1 is mounted on a circuit board or the like. In addition, since a back surface of the electrode portion 24 facing the front surface 24A is embedded inside the core 30, a gap is not generated between the back surface of the electrode portion 24 and the core 30, and when the inductor 1 is mounted on the circuit board, it is possible to prevent the solder from sneaking into the gap and to prevent characteristic deterioration of the inductor 1 at the time of the mounting.

The method for manufacturing the inductor 1 further includes a process of performing barrel polishing on the core 30 in which the conductor 20 is embedded, and the plating process is performed after the process of performing barrel polishing. According to this configuration, since plating is performed on the portion of the conductor 20 exposed from the core 30 after the core 30 is formed into a substantially final product shape by barrel polishing, it is avoided that the other portion of the conductor 20 is newly exposed from the core 30 after plating. As a result, a good mounting state of the inductor 1 on the circuit board can be realized by avoiding a portion having no plating layer from being generated in a portion of the conductor 20 exposed from the core 30.

In addition, the plating process includes a process of applying nickel (Ni) plating to the portion of the conductor 20 exposed from the core 30, and a process of applying tin (Sn) plating on the nickel plating. According to this configuration, it is possible to improve fixing strength between tinning with good solder wettability and the conductor 20.

In addition, the inductor 1 according to the above-described embodiment is an inductor including the core 30 containing magnetic powder and the conductor 20 embedded in the core 30. The core 30 includes the mounting surface 10 facing the mounting substrate side at the time of mounting, the pair of end surfaces 14 orthogonal to the mounting surface 10, and the pair of side surfaces 16 orthogonal to the mounting surface 10 and the pair of end surfaces 14. The conductor 20 includes the conductive wire portion 22 extending inside the core 30 over the pair of end surfaces 14 and the pair of electrode portions 24 extending from the end surface 14 of the core 30 over the mounting surface 10. The side surface of the electrode portion 24 is exposed from the side surface 16 of the core 30, and a plating layer is formed on the exposed side surface of the electrode portion 24.

According to this configuration, since the plating layer is also formed on the electrode side surface of the electrode portion 24, a good mounting state of the inductor 1 on the circuit board can be realized.

The manufacturing method according to the embodiment described above is a manufacturing method of the inductor 1 including the core 30 made of magnetic powder and resin and the conductor 20 embedded in the core 30, and includes a process of embedding the conductor 20 in the core 30 such that a portion of the conductor 20 is exposed from the core 30. In addition, this manufacturing method includes a process of performing a plating pretreatment by a heating treatment in which the core 30 is held at a temperature of 200° C. or more for 40 minutes or more in the air atmosphere, and a process of performing plating on the portion of the conductor 20 exposed from the core 30 after the plating pretreatment.

According to this configuration, it is possible to effectively prevent unintentional plating from being formed on the surface of the core 30 without complicating the manufacturing process, and to prevent characteristic deterioration of the inductor 1 due to the formation of the plating.

In the plating process, the portion of the conductor 20 exposed from the core 30 is nickel-plated and then tin-plated by barrel plating. According to this configuration, tin plating having good solder wettability can be formed on the portion of the conductor 20 exposed from the core 30 with practically sufficient strength without performing a process such as masking.

In addition, this manufacturing method further includes a process of barrel polishing the core 30 in which the conductor 20 is embedded. Then, the process of performing the plating pretreatment is performed after the process of barrel polishing. According to this configuration, when the magnetic particles are exposed from the surface of the core 30 by barrel polishing and unintended plating is likely to be formed on the surface, it is possible to effectively prevent such unintended plating from being formed, and to prevent characteristic deterioration of the inductor 1 due to the formation of the plating.

In addition, the process of performing the plating pretreatment includes a cleaning treatment of etching the surface of the portion of the conductor 20 exposed from the core 30 after the heating treatment. According to this configuration, an unintended oxide film formed on the exposed surface of the conductor 20 by the heating treatment can be removed, and a good plating layer can be formed on the exposed surface.

In the embodiment described above, the electrode portion 24 is formed by bending the conductive plate, but the effect of the plating pretreatment described above is not limited to the case of an electrode (terminal) formed by bending such a conductor plate. The plating pretreatment described above can achieve an effect of preventing unintended plating on the surface of the core in an inductor in which a metal portion having an arbitrary shape exposed from the core is plated to form a terminal.

Supplement 1

A method for manufacturing an inductor including a core made of magnetic powder and a resin, and a conductor embedded in the core. The method includes a process of forming the conductor by bending a conductive plate; a process of embedding the conductor in the core such that a portion of the conductor is exposed from the core; and a process of plating a surface portion of the conductor exposed from the core.

Supplement 2

The method of manufacturing an inductor, in which in the embedding process, the conductor is embedded in the core such that a side surface of an electrode portion which is a portion of the conductor is exposed from the core.

Supplement 3

The method of manufacturing an inductor, in which the core includes a mounting surface facing a mounting substrate side at a time of mounting, a pair of end surfaces orthogonal to the mounting surface, and a pair of side surfaces orthogonal to the mounting surface and the pair of end surfaces. The conductor includes a conductive wire portion extending inside the core over the pair of end surfaces and a pair of electrode portions extending from the end surface of the core to the mounting surface in a state of being embedded in the core. In the embedding process, the conductor is embedded in the core such that one surface of the electrode portion is exposed from the mounting surface, the other surface facing the one surface is embedded in the core, and the side surface of the electrode portion is exposed from the side surface of the core.

Supplement 4

The method of manufacturing an inductor, further including a process of performing barrel polishing on the core in which the conductor is embedded, in which performing plating is performed after performing barrel polishing.

Supplement 5

The method of manufacturing an inductor, in which the process of performing plating includes a process of performing nickel plating (Ni plating) on a portion of the conductor exposed from the core, and a process of performing tin plating (Sn plating) on the nickel plating.

Supplement 6

An inductor including a core containing magnetic powder and a conductor embedded in the core, in which the core includes a mounting surface facing a mounting substrate side at a time of mounting, a pair of end surfaces orthogonal to the mounting surface, and a pair of side surfaces orthogonal to the mounting surface and the pair of end surfaces. The conductor includes a conductive wire portion extending inside the core over the pair of end surfaces and a pair of electrode portions extending from the end surface to the mounting surface of the core, a side surface of the electrode portion is exposed from the side surface of the core, and a plating layer is formed on the exposed side surface of the electrode portion.

Supplement 7

A method for manufacturing an inductor including a core made of magnetic powder and resin, and a conductor embedded in the core. The method includes a process of embedding the conductor in the core such that a portion of the conductor is exposed from the core; a process of performing plating pretreatment by heating treatment of holding the core at a temperature of 200° C. or more for 40 minutes or more in an air atmosphere; and a process of plating a portion of the conductor exposed from the core after the plating pretreatment.

Supplement 8

The method for manufacturing an inductor, in which in the plating process, nickel (Ni) plating is applied to a portion of the conductor exposed from the core by barrel plating, and then tin (Sn) plating is applied.

Supplement 9

The method for manufacturing an inductor, further including a process of performing barrel polishing on the core in which the conductor is embedded, in which the process of performing the plating pretreatment is performed after the process of performing barrel polishing.

Supplement 10

The method for manufacturing an inductor, in which the process of performing the plating pretreatment includes etching a surface of a portion of the conductor exposed from the core after the heating treatment.

Note that the above-described embodiment is merely an example of one aspect of the present disclosure, and can be arbitrarily modified and applied without departing from the gist of the present disclosure.

The directions such as horizontal and vertical directions, various numerical values, shapes, and materials in the above-described embodiment includes a range (so-called equivalent range) in which the same functions and effects as those of the directions, numerical values, shapes, and materials are exhibited unless otherwise specified.

What is claimed is:

1. An inductor comprising:

a core containing magnetic powder; and a conductor embedded in the core, wherein the core includes a mounting surface facing a mounting substrate side at a time of mounting, a pair of end surfaces orthogonal to the mounting surface, and a pair of side surfaces orthogonal to the mounting surface and the pair of end surfaces, the conductor includes a conductive wire portion extending inside the core over the pair of end surfaces, and a pair of electrode portions, each of the electrode portions being at a respective one of end portions of the conductive wire portion and extending from a respective one of the end surfaces to the mounting surface of the core, at least one of the electrode portions is exposed to at least one of the side surfaces of the core, and at each of the end portions of the conductive wire portion, an edge of the conductive wire portion at one of the side surfaces of the core has a cutout shape in which one end of the edge of the conductive wire portion is located further inside the core from another end of the edge of the conductive wire portion at which the conductive wire portion is connected to a respective one of the electrode portions.

2. The inductor according to claim 1, wherein a nickel plating layer and a tin plating layer are at a portion of a surface of at least one of the electrode portions, the portion being exposed to a respective one of the side surfaces of the core.

3. The inductor according to claim 1, wherein each of the electrode portions is exposed to at least one of the side surfaces of the core.

4. The inductor according to claim 1, wherein each of the electrode portions is exposed to each of the side surfaces of the core.

5. The inductor according to claim 1, wherein a nickel plating layer and a tin plating layer are at a portion of a respective surface of each of the electrode portions, the portion being exposed to a respective one of the side surfaces of the core.

6. The inductor according to claim 1, wherein the edge of the conductive wire portion at one of the side surfaces of the core has the cutout shape in which the conductive wire portion is cut out from the side surface of the core toward the inside of the core.

7. The inductor according to claim 1, wherein the edge of the conductive wire portion at one of the side surfaces of the core has the cutout shape in which a location inside the core is cut out from a location connected to the electrode portion.

* * * * *